US012783830B1

(12) United States Patent
Sieckowski et al.

(10) Patent No.: US 12,783,830 B1
(45) Date of Patent: Nov. 3, 2026

(54) CHARGING CRADLE, HAND-HELD INDICIA READER, AND ASSEMBLY OF SAME

(71) Applicant: Zebra Technologies Corporation, Lincolnshire, IL (US)

(72) Inventors: Steven D. Sieckowski, Port Jefferson, NY (US); Brian M. Walters, Nesconset, NY (US); Yuri Astvatsaturov, Lake Forest, IL (US)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

(21) Appl. No.: 19/312,272

(22) Filed: Aug. 27, 2025

(51) Int. Cl.
*G06K 7/10* (2006.01)
*H02J 7/70* (2026.01)
*H02J 50/10* (2016.01)

(52) U.S. Cl.
CPC .......... *G06K 7/10881* (2013.01); *H02J 7/731* (2026.01); *H02J 50/10* (2016.02)

(58) Field of Classification Search
CPC ....... G06K 7/10881; H02J 50/10; H02J 7/731
USPC ..................................................... 235/472.01
See application file for complete search history.

(56) References Cited

U.S. PATENT DOCUMENTS

| | | | | |
|---|---|---|---|---|
| 8,157,177 B1 * | 4/2012 | O'Donnell | G06K 7/10386 | 235/472.01 |
| 8,186,597 B1 * | 5/2012 | Fletcher | G06K 7/10881 | 235/462.43 |
| 12,437,164 B2 * | 10/2025 | Trongone | G06K 7/10881 | |
| 2012/0319645 A1 * | 12/2012 | O'Donnell | H02J 50/402 | 320/108 |
| 2018/0205249 A1 * | 7/2018 | Colavito | H02J 7/82 | |
| 2023/0316016 A1 * | 10/2023 | Handshaw | G06K 7/1096 | 235/462.41 |
| 2023/0316020 A1 * | 10/2023 | Handshaw | G06K 7/10386 | 235/472.01 |

* cited by examiner

*Primary Examiner* — Daniel A Hess

(57) ABSTRACT

An example assembly includes a hand-held indicia reader having a housing that defines a handle and a charging cradle having a passageway formed through a housing of the charging cradle and configured to receive the handle of the hand-held indicia reader within the passageway. The passageway extends through a top surface of the charging cradle and through a bottom surface of the charging cradle, opposite the top surface, and includes a first induction charging coil that extends around the passageway. The hand-held indicia reader includes a permanent, non-replaceable power source and a second induction charging coil operably connected to the permanent, non-replaceable power source. The second induction charging coil is positioned within the handle such that the second induction charging coil is generally axially aligned with the first induction charging coil with the hand-held indicia reader positioned within the passageway of the charging cradle.

20 Claims, 5 Drawing Sheets

CHARGING CRADLE, HAND-HELD INDICIA READER, AND ASSEMBLY OF SAME

BACKGROUND

Conventional charging cradles for hand-held indicia readers typically include an enclosed cavity to receive a handle of a hand-held indicia reader that limits access to internal surfaces of the cavity, causing cleaning difficulties especially for areas within the enclosed cavity. In applications where hygiene is critical, such as healthcare or food service industries, maintaining a high standard of cleanliness can be labor-intensive and time-consuming. Efforts to manually clean enclosed cavity charger designs may result in incomplete sanitation and leave surfaces susceptible to contamination.

Moreover, conventional charging cradles frequently rely on physical electrical contacts, such as metal contact pins or terminals, to provide a conductive pathway between the charging cradle and the hand-held indica reader to enable charging. Over time, these physical electrical contact-based systems are prone to wear, corrosion, and debris accumulation, which can impair connectivity and functionality. Furthermore, cleaning physical electrical contact points in such designs is often challenging due to their recessed placements within the enclosed cavity of the charging cradle and the presence of small crevices where dirt and contaminants can accumulate.

In addition, conventional hand-held indica readers typically utilize replaceable batteries as their primary power source, which can require regular battery maintenance, replacement, or servicing and may introduce additional vulnerabilities when exposed to cleaning chemicals or liquid ingress, potentially compromising performance.

SUMMARY

In an embodiment, the present invention is an assembly, comprising a hand-held indicia reader having a housing that defines a head and a handle extending from the head and a charging cradle having a passageway formed therethrough that extends through a top surface of a housing of the charging cradle and through a bottom surface of the housing of the charging cradle, opposite the top surface, and configured to receive the handle of the hand-held indicia reader within the passageway. The charging cradle includes a first induction charging coil within the housing of the charging cradle that extends around the passageway. The hand-held indicia reader includes a permanent, non-replaceable power source within the housing of the hand-held indicia reader and a second induction charging coil operably connected to the permanent, non-replaceable power source. The second induction charging coil is positioned within the handle of the hand-held indicia reader such that the second induction charging coil is generally axially aligned with the first induction charging coil with the hand-held indicia reader positioned within the passageway of the charging cradle.

In a variation of this embodiment, the second induction charging coil is positioned within the handle such that the second induction charging coil is generally adjacent the first induction charging coil with the hand-held indicia reader positioned within the passageway of the charging cradle.

In another variation of this embodiment, the passageway through the charging cradle is tapered from the top surface to the bottom surface of the charging cradle.

In another variation of this embodiment, a bottom circumference of the passageway at the bottom surface of the housing is greater than or equal to 90% of a top circumference of the passageway at the top surface of the housing.

In another variation of this embodiment, the permanent, non-replaceable power source is a super capacitor.

In another variation of this embodiment, the housing of the charging cradle surrounding the passageway is fully sealed from an environment external to the charging cradle.

In another variation of this embodiment, the handle of the hand-held indicia reader is fully sealed from an environment external to the hand-held indicia reader.

In another variation of this embodiment, the charging cradle includes a retention hook formed in the passageway and configured to removably retain the hand-held indicia reader within the passageway.

In another variation of this embodiment, the charging cradle includes a first magnet positioned within the housing of the charging cradle and adjacent the passageway and the hand-held indicia reader includes a second magnet within the handle of the hand-held indicia reader. The second magnet in the hand-held indicia reader is adjacent the first magnet in the charging cradle with the hand-held indicia reader positioned within the passageway of the charging cradle to removably retain the hand-held indicia reader within the passageway.

In another embodiment, the present invention is a charging cradle for a hand-held indicia reader, comprising a housing forming a passageway through the charging cradle. The passageway extends through a top surface of the housing of the charging cradle and through a bottom surface of the housing of the charging cradle, opposite the top surface, and is configured to receive a handle of the hand-held indicia reader within the passageway. A first induction charging coil is within the housing and extends around the passageway and is positioned within the housing such that the first induction charging coil is generally axially aligned with a second induction charging coil in the handle of the hand-held indicia reader with the hand-held indicia reader positioned within the passageway of the charging cradle.

In a variation of this embodiment, the first induction charging coil is positioned within the housing such that the first induction charging coil is generally adjacent the second induction charging coil of the hand-held indicia reader with the hand-held indicia reader positioned within the passageway.

In another variation of this embodiment, the passageway through the charging cradle is tapered from the top surface to the bottom surface.

In another variation of this embodiment, a bottom circumference of the passageway at the bottom surface of the housing is greater than or equal to 90% of a top circumference of the passageway at the top surface of the housing.

In another variation of this embodiment, the housing of the charging cradle surrounding the passageway is fully sealed from an environment external to the charging cradle.

In another variation of this embodiment, the charging cradle includes a retention hook formed in the passageway.

In another variation of this embodiment, the charging cradle includes a first magnet within the housing and adjacent the passageway. The first magnet is positioned such that the first magnet is adjacent a second magnet in the hand-held indicia reader with the hand-held indicia reader positioned within the passageway.

In another embodiment, the present invention is a hand-held indicia reader, comprising a housing that defines a head and a handle extending from the head and fully sealed from an environment external to the hand-held indicia reader. A permanent, non-replaceable power source is within the housing of the hand-held indicia reader and a second induction charging coil is operably connected to the permanent, non-replaceable power source, is positioned within the handle of the hand-held indicia reader, and is generally axially aligned with a longitudinal axis of the handle.

In a variation of this embodiment, the second induction charging coil is positioned within the handle such that the second induction charging coil is generally axially aligned with a first induction charging coil of a charging cradle with the hand-held indicia reader positioned within a passageway of the charging cradle.

In another variation of this embodiment, the second induction charging coil is positioned within the handle such that the second induction charging coil is generally adjacent the first induction charging coil with the hand-held indicia reader positioned within the passageway of the charging cradle.

In another variation of this embodiment, the permanent, non-replaceable power source is a super capacitor.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
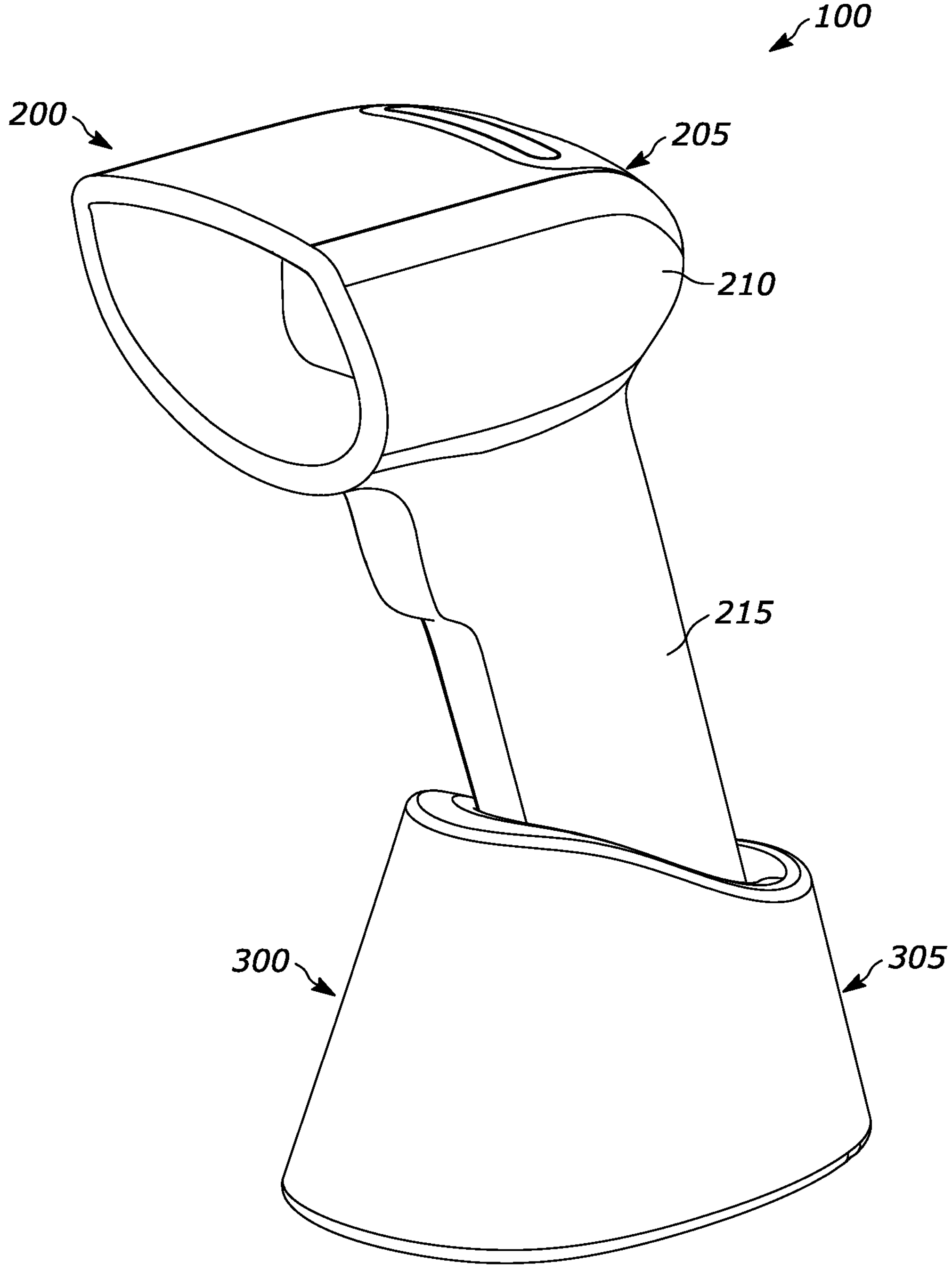
FIG. 1 illustrates a perspective view of an example assembly.

Skilled artisans will appreciate that elements in the figures are illustrated for simplicity and clarity, have not necessarily been drawn to scale, and that details that are not necessary for an understanding of the invention or that render other details difficult to perceive may be omitted. For example, the dimensions of some of the elements in the figures may be exaggerated relative to other elements to help to improve understanding of embodiments of the present invention.

The apparatus components have been represented where appropriate by conventional symbols in the drawings, showing only those components and specific details that are pertinent to understanding the examples of the present invention so as not to obscure the disclosure with details that will be readily apparent to those of ordinary skill in the art having the benefit of the description herein.

DETAILED DESCRIPTION

The example charging cradle, hand-held indica reader, and assembly of charging cradle and hand-held indica reader herein provide charging cradles and hand-held indica readers having ergonomic and hygiene-focused features. The assembly incorporates induction charging technology and the charging cradle and hand-held indicia reader address key challenges associated with traditional charging cradle and hand-held indicia readers, particularly in environments requiring strict cleanliness standards, like healthcare, food processing, and similar industries demanding hygiene compliance. By integrating features such as a charging well in the charging cradle that passes completely through the charging cradle, a permanent, non-replaceable power source, and sealed construction, device longevity, cleanliness, and user convenience can be improved.

The assembly includes induction charging of the hand-held indicia reader by the charging cradle, as opposed to physical contact charging mechanisms, which can reduce wear and tear and eliminate accumulated debris or contaminants in traditional interfaces.

The handle of the hand-held indicia reader and the charging well of the charging cradle are also fully sealed from the outside environment. This enables easier cleaning of the hand-held indicia reader and the charging cradle and ensures that the internal components of each remain insulated from external contaminants like dust, moisture, or other particles that may compromise functionality over time. The sealed construction reduces the likelihood of contamination, a crucial feature in hygiene-focused environments, allowing users to sanitize both the handle and cradle efficiently and thoroughly.

Additional retention mechanisms, such as a retention hook and/or magnets, can also be used to assist in retention of the hand-held indicia reader in the charging cradle, which can be beneficial particularly in over-the-monitor configurations where vertical alignment challenges may arise.

The hand-held indicia reader can also include a super capacitor as a permanent, non-replaceable power source, which can increasing the operational reliability of the hand-held indicia reader, eliminating the need for routine battery replacement, and allow the handle of the hand-held indicia reader to be fully sealed In addressing hygiene-related issues, the charging cradle, hand-held indicia reader, and assembly herein can simplify cleaning tasks. With the open-bottom design of the charging cradle and its sealed passageway, users can sanitize the charging well from both sides of the charging cradle using conventional or specialized cleaning solutions without leaving inaccessible areas where contaminants might accumulate. This accessibility improves a facility's compliance with regulations and standards for cleanliness and sterilization. The lack of physical charging contacts between the charging cradle and the hand-held indicia reader further mitigates the risk of contamination.

Figure 2:
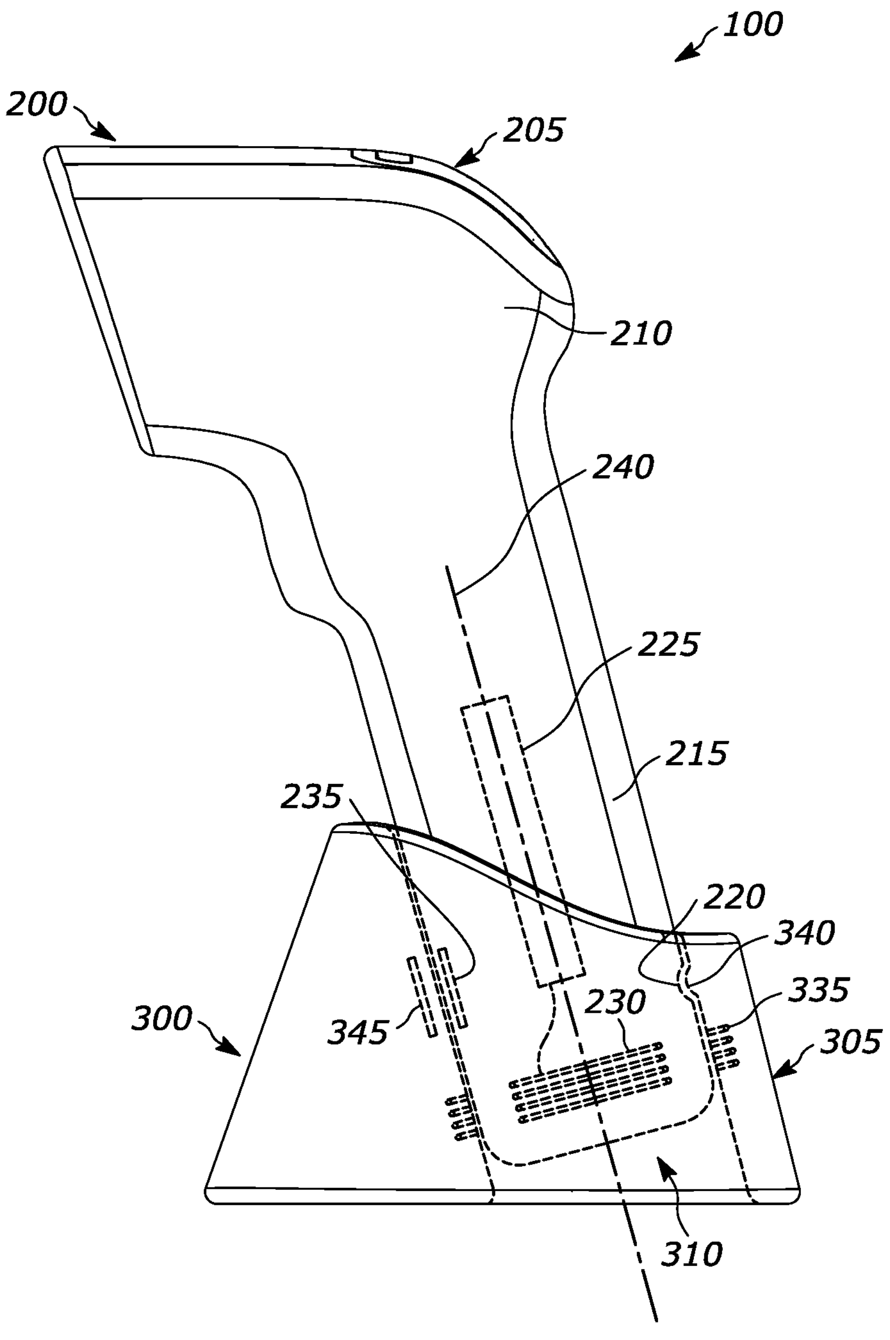
FIG. 2 illustrates a side view of the assembly of FIG. 1.

Referring to FIGS. 1 and 2, an example assembly 100 generally includes a hand-held indicia reader 200 and a charging cradle 300 configured to receive and charge hand-held indicia reader 200. Hand-held indicia reader 200 can be a barcode reader, RFID tag reader, or any other type indicia reader.

Figure 3:
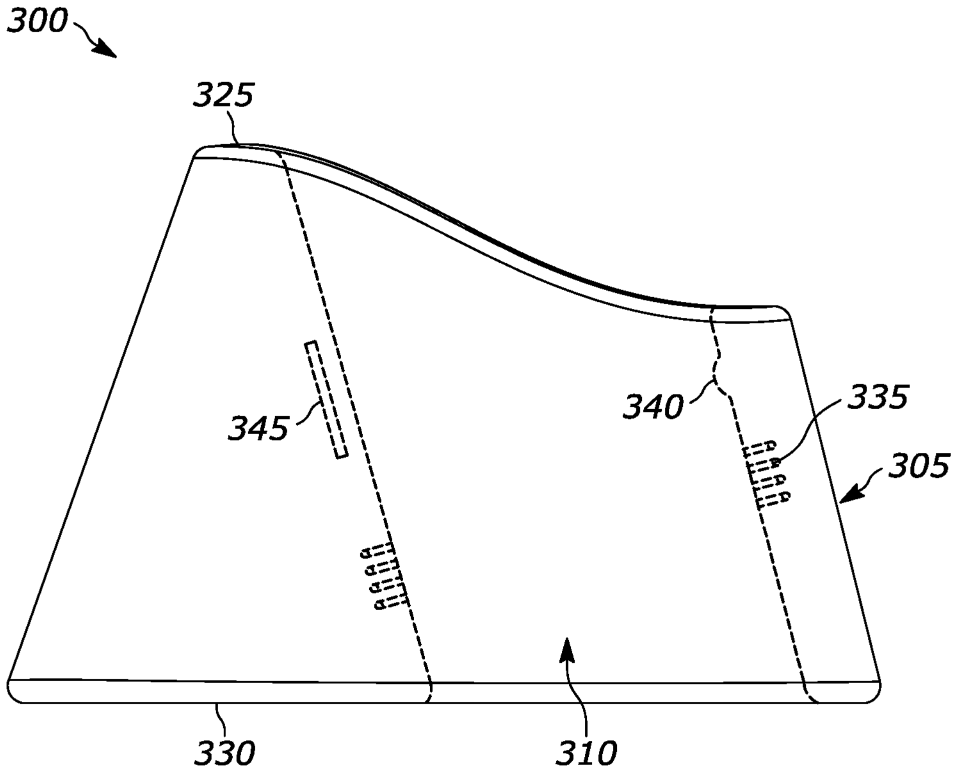
FIG. 3 illustrates a side view of an example charging cradle of the assembly of FIG. 1.
Figure 4:
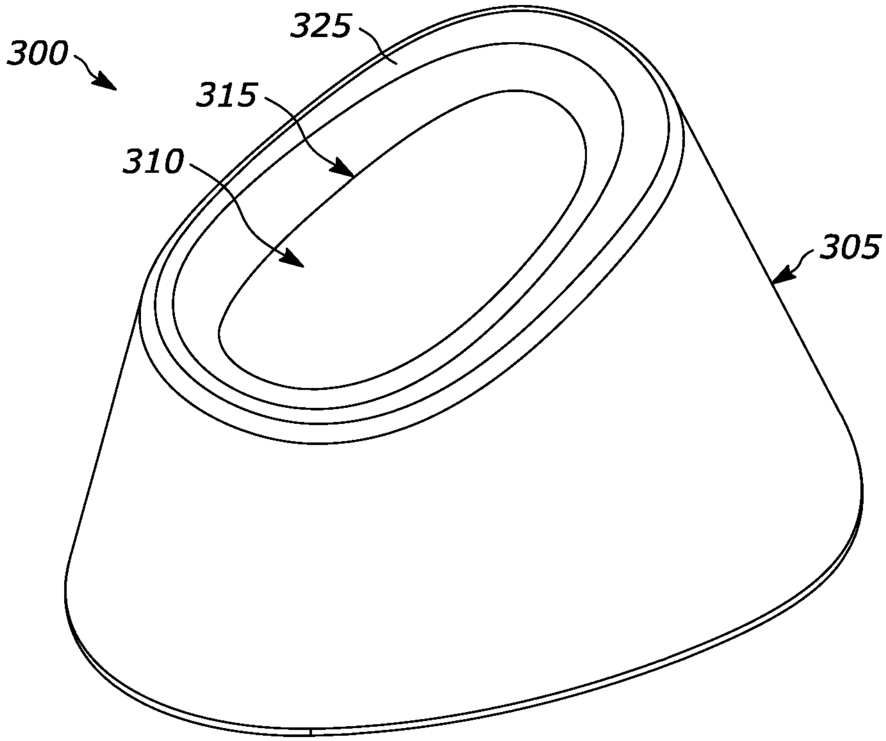
FIG. 4 illustrates a top perspective view of the charging cradle of FIG. 3.
Figure 5:
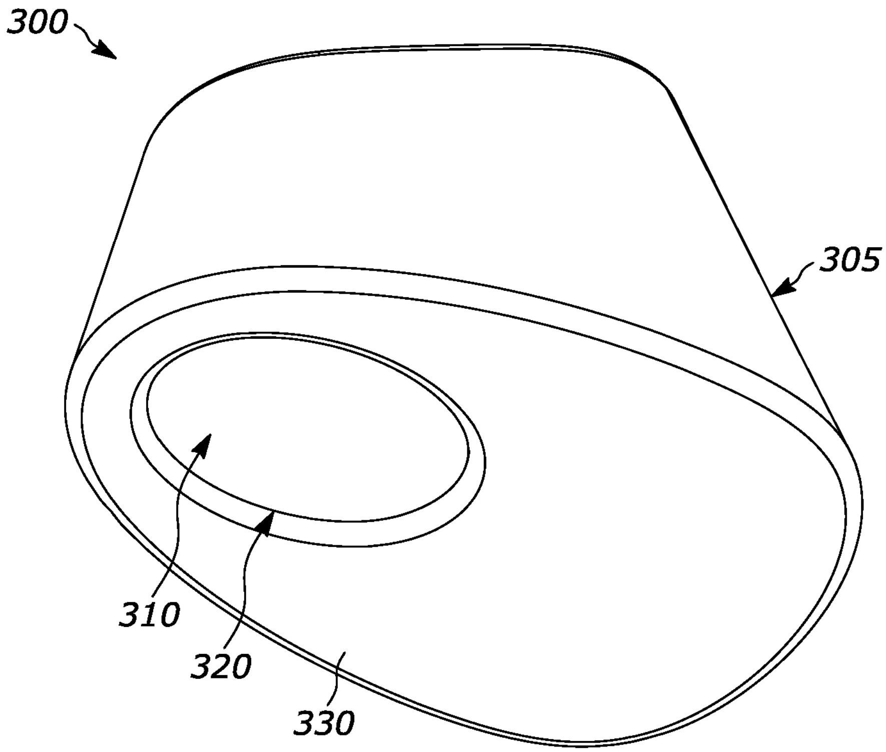
FIG. 5 illustrates a bottom perspective view of the charging cradle of FIG. 3.

Referring to FIGS. 3-5, example charging cradle 300 has a housing 305 that forms a passageway 310 (e.g., a charging well) completely through charging cradle 300. Passageway 310 is configured to receive handle 215 of hand-held indicia reader 200 (see FIGS. 1 and 2) and extends through a top surface 325 of housing 305 of charging cradle 300 and through a bottom surface 330 of housing 305 of charging cradle 300, opposite top surface 325. Having passageway 310 extend through top surface 325, through bottom surface 330 and completely through hand-held indicia reader 200 allows passageway 310 to be more easily cleaned, because passageway 310 can be accessed through top surface 325 and through bottom surface 330. In addition, the portion of housing 305 that surrounds passageway 310 is fully sealed from an environment external to charging cradle 300 (e.g., does not include any openings or seams). Having passageway 310 fully sealed makes charging cradle 300 more hygienic and easier to clean, since there are no seams or crevices to trap dirt or debris and to be cleaned.

In the example shown, passageway 310 is tapered from top surface 325 to bottom surface 330 and handle 215 of hand-held indicia reader 200 is similarly tapered so handle 215 of hand-held indicia reader 200 does not pass all the way through. For example, a bottom circumference 320 of passageway 310 at bottom surface 330 of housing 305 can be greater than or equal to 90% and less than 100% of a top circumference 315 of passageway 310 at top surface 325 of housing 305. In other implementations, passageway 310 and handle 215 do not have to be tapered and other means can be used to prevent handle 215 of hand-held indicia reader 200 from passing all the way through passageway 310 and through bottom surface 330.

Figure 6:
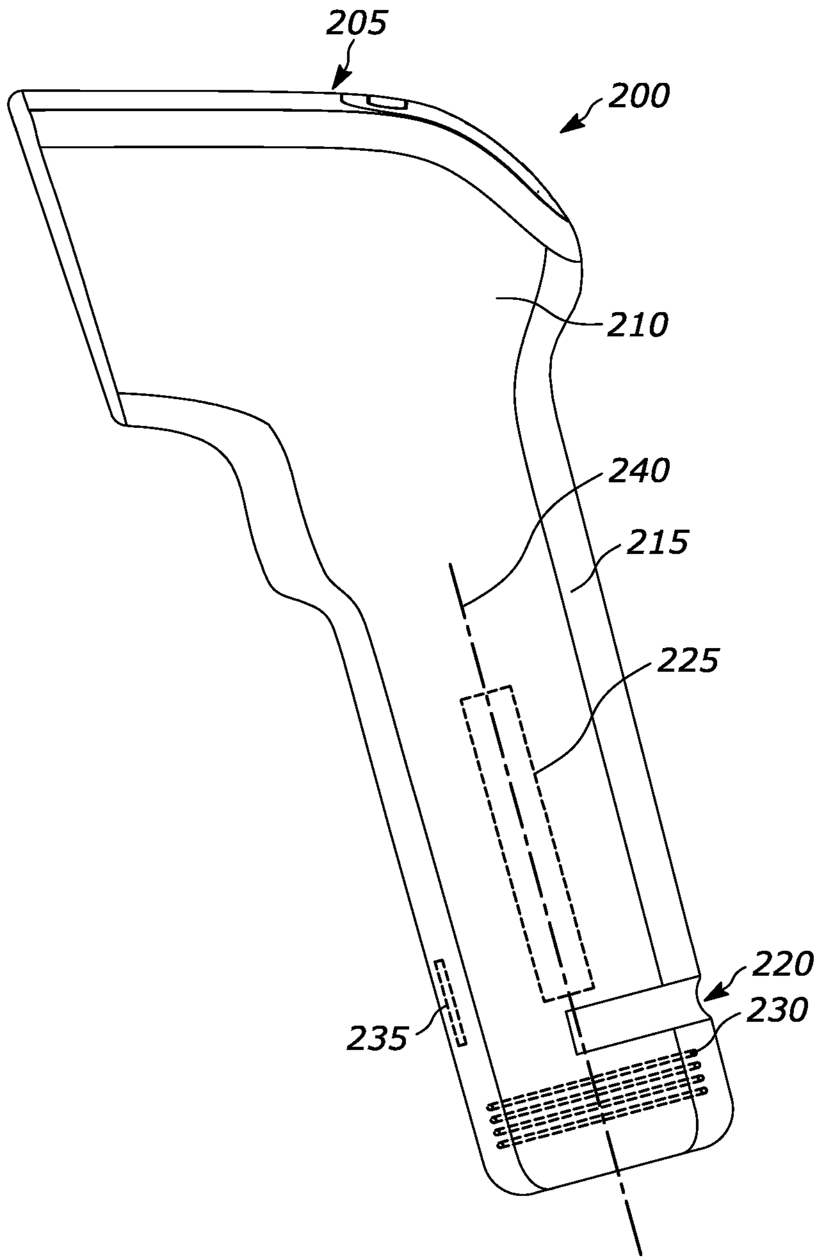
FIG. 6 illustrates a side view of an example hand-held indica reader of the assembly of FIG. 1.

Referring to FIG. 6, example hand-held indicia reader 200 has a housing 205 that defines a head 210 and a handle 215 that extends from head 210. In the example shown, handle 215 is fully sealed from an environment external to hand-held indicia reader 200 (e.g., does not include any openings or seams). Having handle 215 fully sealed makes hand-held indicia reader 200 more hygienic and easier to clean, since there are no seams or crevices to trap dirt or debris and to be cleaned. Hand-held indicia reader 200 also includes a power source 225 within housing 205 (e.g., within handle 215), which in the example shown, is a permanent, non-replaceable power source, such as a super conductor.

To provide charging of hand-held indicia reader 200 when received in charging cradle 300, charging cradle 300 includes a first induction charging coil 335 (FIGS. 2 and 3) and hand-held indicia reader 200 includes a second induction charging coil 230 (FIGS. 2 and 6). First induction charging coil 335 of charging cradle 300 is positioned within housing 305 such that first induction charging coil 335 extends generally circumferentially around passageway 310. Second induction charging coil 230 of hand-held indicia reader 200 is operably connected to power source 225, is generally axially aligned with a longitudinal axis 240 of handle 215, and is positioned within handle 215 such that second induction charging coil 230 extends generally circumferentially within handle 215. First induction charging coil 335 and second induction charging coil 230 are each positioned such that first induction charging coil 335 of charging cradle 300 is generally axially aligned with second induction charging coil 230 in handle 215 of hand-held indicia reader 200 with hand-held indicia reader 200 positioned within passageway 310 of charging cradle 300. As shown in FIG. 2, in some implementations, first induction charging coil 335 can be positioned within housing 305 and second induction charging coil 230 can be positioned within handle 215 such that first induction charging coil 335 is generally adjacent second induction charging coil 230 of hand-held indicia reader 200 with hand-held indicia reader 200 positioned within passageway 310. In other implementations, second induction charging coil 230 could be positioned in head 210 of hand-held indicia reader 200 and first induction charging coil 335 could be positioned in housing 305 of charging cradle 300 such that second induction charging coil 230 and first induction charging coil 335 are generally axially aligned with hand-held indicia reader 200 positioned within passageway 310, but not necessary adjacent.

In some implementations, it may be beneficial or necessary to removably retain hand-held indicia reader 200 in passageway 310 of charging cradle 300, for example, in environments where assembly 100 will be used horizontally (e.g., over a monitor). Referring to FIGS. 2, 3, and 6, in the example shown, to assist in the retention of hand-held indicia reader 200 within passageway 310 of charging cradle 300, charging cradle 300 includes a retention hook 340 formed in passageway 310. As illustrated, retention hook 340 can be a protrusion that extends into passageway 310 that is configured to engage a recess 220 in handle 215 of hand-held indicia reader 200 with the hand-held indicia reader 200 positioned within charging cradle 300. In addition to, or instead of, retention hook 340 and recess 220, charging cradle 300 can include a first magnet 345 positioned within housing 305 and adjacent passageway 310 and hand-held indicia reader 200 can include a second magnet 235 within handle 215, such that second magnet 235 in handle 215 of hand-held indicia reader 200 is adjacent to first magnet 345 in charging cradle 300 with hand-held indicia reader 200 positioned within passageway 310 of charging cradle 300 to assist in retention of hand-held indicia reader 200 within passageway 310 of charging cradle 300.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

The invention claimed is:

1. An assembly, comprising:

a hand-held indicia reader having a housing that defines a head and a handle extending from the head; and a charging cradle having a passageway formed therethrough, the passageway extending through a top surface of a housing of the charging cradle and through a bottom surface of the housing of the charging cradle, opposite the top surface, and configured to receive the handle of the hand-held indicia reader within the passageway;

wherein the charging cradle includes a first induction charging coil within the housing of the charging cradle and extending around the passageway; and wherein the hand-held indicia reader includes a permanent, non-replaceable power source within the housing of the hand-held indicia reader and a second induction charging coil operably connected to the permanent, non-replaceable power source, the second induction charging coil positioned within the handle of the hand-held indicia reader such that the second induction charging coil is generally axially aligned with the first induction charging coil with the hand-held indicia reader positioned within the passageway of the charging cradle.

2. The assembly of claim 1, wherein the second induction charging coil is positioned within the handle such that the second induction charging coil is generally adjacent the first induction charging coil with the hand-held indicia reader positioned within the passageway of the charging cradle.

3. The assembly of claim 1, wherein the passageway through the charging cradle is tapered from the top surface to the bottom surface of the charging cradle.

4. The assembly of claim 3, wherein a bottom circumference of the passageway at the bottom surface of the housing is greater than or equal to 90% of a top circumference of the passageway at the top surface of the housing.

5. The assembly of claim 1, wherein the permanent, non-replaceable power source is a super capacitor.

6. The assembly of claim 1, wherein the housing of the charging cradle surrounding the passageway is fully sealed from an environment external to the charging cradle.

7. The assembly of claim 1, wherein the handle of the hand-held indicia reader is fully sealed from an environment external to the hand-held indicia reader.

8. The assembly of claim 1, wherein the charging cradle includes a retention hook formed in the passageway and configured to removably retain the hand-held indicia reader within the passageway.

9. The assembly of claim 1, wherein:

the charging cradle includes a first magnet positioned within the housing of the charging cradle and adjacent the passageway;

the hand-held indicia reader comprises a second magnet within the handle of the hand-held indicia reader; and the second magnet in the hand-held indicia reader is adjacent the first magnet in the charging cradle with the hand-held indicia reader positioned within the passageway of the charging cradle to removably retain the hand-held indicia reader within the passageway.

10. A charging cradle for a hand-held indicia reader, the charging cradle comprising:

a housing forming a passageway through the charging cradle, the passageway extending through a top surface of the housing of the charging cradle and through a bottom surface of the housing of the charging cradle, opposite the top surface, and configured to receive a handle of the hand-held indicia reader within the passageway; and a first induction charging coil within the housing and extending around the passageway, wherein the first induction charging coil is positioned within the housing such that the first induction charging coil is generally axially aligned with a second induction charging coil in the handle of the hand-held indicia reader with the hand-held indicia reader positioned within the passageway of the charging cradle.

11. The charging cradle of claim 10, wherein the first induction charging coil is positioned within the housing such that the first induction charging coil is generally adjacent the second induction charging coil of the hand-held indicia reader with the hand-held indicia reader positioned within the passageway.

12. The charging cradle of claim 10, wherein the passageway through the charging cradle is tapered from the top surface to the bottom surface.

13. The charging cradle of claim 12, wherein a bottom circumference of the passageway at the bottom surface of the housing is greater than or equal to 90% of a top circumference of the passageway at the top surface of the housing.

14. The charging cradle of claim 10, wherein the housing of the charging cradle surrounding the passageway is fully sealed from an environment external to the charging cradle.

15. The charging cradle of claim 10, wherein the charging cradle includes a retention hook formed in the passageway.

16. The charging cradle of claim 10, comprising a first magnet within the housing and adjacent the passageway, wherein the first magnet is positioned such that the first magnet is adjacent a second magnet in the hand-held indicia reader with the hand-held indicia reader positioned within the passageway.

17. A hand-held indicia reader, comprising:

a housing that defines a head and a handle extending from the head, wherein the handle is fully sealed from an environment external to the hand-held indicia reader;

a permanent, non-replaceable power source within the housing of the hand-held indicia reader; and a second induction charging coil operably connected to the permanent, non-replaceable power source and positioned within the handle of the hand-held indicia reader, wherein the second induction charging coil is generally axially aligned with a longitudinal axis of the handle.

18. The hand-held indicia reader of claim 17, wherein the second induction charging coil is positioned within the handle such that the second induction charging coil is generally axially aligned with a first induction charging coil of a charging cradle with the hand-held indicia reader positioned within a passageway of the charging cradle.

19. The hand-held indicia reader of claim 18, wherein the second induction charging coil is positioned within the handle such that the second induction charging coil is generally adjacent the first induction charging coil with the hand-held indicia reader positioned within the passageway of the charging cradle.

20. The hand-held indicia reader of claim 17, wherein the permanent, non-replaceable power source is a super capacitor.

* * * * *